United States Patent
Kataoka

(10) Patent No.: US 11,285,601 B2
(45) Date of Patent: Mar. 29, 2022

(54) GEARING, GEARING UNIT, AND ROBOT

(71) Applicant: Seiko Epson Corporation, Tokyo (JP)

(72) Inventor: Yuya Kataoka, Chino (JP)

(73) Assignee: Seiko Epson Corporation

( * ) Notice: Subject to any disclaimer, the term of this patent is extended or adjusted under 35 U.S.C. 154(b) by 112 days.

(21) Appl. No.: 16/556,393

(22) Filed: Aug. 30, 2019

(65) Prior Publication Data

US 2020/0070339 A1 Mar. 5, 2020

(30) Foreign Application Priority Data

Aug. 31, 2018 (JP) .............................. JP2018-162584

(51) Int. Cl.
| | | |
|---|---|---|
| *B25J 9/10* | (2006.01) | |
| *B25J 18/00* | (2006.01) | |
| *F16H 55/17* | (2006.01) | |
| *F16H 49/00* | (2006.01) | |

(52) U.S. Cl.
CPC ............ *B25J 9/1025* (2013.01); *B25J 18/002* (2013.01); *F16H 55/17* (2013.01); *F16H 2049/003* (2013.01)

(58) Field of Classification Search
CPC ....... B25J 9/1025; B25J 18/002; F16H 55/17; F16H 2049/003
See application file for complete search history.

(56) References Cited

U.S. PATENT DOCUMENTS

| | | | | |
|---|---|---|---|---|
| 5,269,202 | A | * | 12/1993 | Kiyosawa ............. F16H 49/001 74/640 |
| 7,530,292 | B2 | * | 5/2009 | Ishikawa ............. F16H 55/0833 74/640 |
| 2012/0304791 | A1 | | 12/2012 | Ishikawa |
| 2014/0165758 | A1 | * | 6/2014 | Moune ................... F16H 49/001 74/412 R |
| 2017/0219050 | A1 | * | 8/2017 | Handa ....................... F16H 1/32 |
| 2017/0227106 | A1 | * | 8/2017 | Takizawa ............. F16H 49/001 |
| 2018/0283518 | A1 | * | 10/2018 | Kataoka .................... B25J 17/00 |
| 2019/0186599 | A1 | * | 6/2019 | Tang ........................ F16H 49/00 |
| 2019/0368576 | A1 | * | 12/2019 | Shirokoshi .......... F16H 55/0833 |
| 2020/0032891 | A1 | * | 1/2020 | Kobayashi ............. F16H 49/001 |
| 2020/0056653 | A1 | * | 2/2020 | Kimura ................... F16C 19/08 |
| 2020/0063847 | A1 | * | 2/2020 | Preu ........................ F01L 1/344 |

(Continued)

FOREIGN PATENT DOCUMENTS

| | | |
|---|---|---|
| JP | H04-128558 U | 11/1992 |
| JP | 2000-179631 A | 6/2000 |

(Continued)

*Primary Examiner* — Zakaria Elahmadi
(74) *Attorney, Agent, or Firm* — Hanress, Dickey & Pierce, P.L.C.

(57) ABSTRACT

A gearing includes an internal gear, an external gear including external teeth placed around a rotation axis and meshing with the internal gear, a barrel part adjacent to the external teeth along the rotation axis, and an inner circumferential surface on an inner surface of the external teeth, and having flexibility and relatively rotating about the rotation axis to the internal gear, and a wave generator including a bearing having an outer ring in contact with the inner circumferential surface, an inner ring, and balls intervening between the outer ring and the inner ring, and moving a mesh position between the internal gear and the external gear about the rotation axis.

5 Claims, 7 Drawing Sheets

(56) References Cited

U.S. PATENT DOCUMENTS

| | | | | |
|---|---|---|---|---|
| 2020/0072318 A1* | 3/2020 | Shirouzu | .................... | F16H 1/32 |
| 2020/0232549 A1* | 7/2020 | Shirokoshi | .............. | F16H 57/04 |
| 2020/0340569 A1* | 10/2020 | Johansen | ................. | B25J 17/00 |

FOREIGN PATENT DOCUMENTS

| JP | 2007-040517 A | 2/2007 |
|---|---|---|
| JP | 2012-251588 A | 12/2012 |

* cited by examiner

GEARING, GEARING UNIT, AND ROBOT

The present application is based on, and claims priority from, JP Application Serial Number 2018-162584, filed Aug. 31, 2018, the disclosure of which is hereby incorporated by reference herein in its entirety.

BACKGROUND

1. Technical Field

The present disclosure relates to a gearing, gearing unit, and robot.

2. Related Art

In a robot having a robot arm including at least one arm, for example, a joint part of the robot arm is pivoted by motor drive. In this regard, the rotation by the drive force of the motor is reduced by a gearing (reducer) and transmitted to the robot arm.

For example, a gear-type harmonic reducer described in JP-UM-A-04-128558 has a rigid annular internal gear member, a flexible cup-shaped external gear member placed inside of the member, and a wave generator that bends the cup-shaped external gear member in a radial direction and partially meshes external teeth with internal teeth of the annular internal gear member, includes a ball bearing, and moves a mesh position in a circumferential direction. Further, it is disclosed that the center position of the ball of the wave generator is within a half of a face width of the external teeth when the position is measured from the open end of the cup-shaped external gear member in the face width direction. Thereby, the mesh between the external teeth and the internal teeth may be maintained.

However, when the center position of the ball of the wave generator is set to the position described in JP-UM-A-04-128558, the amount of mesh between the external teeth and the internal teeth decreases. Then, load stress generated in part of the external teeth may be higher. Accordingly, durability of the external gear member may be lower.

SUMMARY

A gearing according to an application example of the present disclosure includes an internal gear, an external gear including external teeth placed around a rotation axis and meshing with the internal gear, a barrel part adjacent to the external teeth along the rotation axis, and an inner circumferential surface on an inner surface of the external teeth, and having flexibility and relatively rotating about the rotation axis to the internal gear, and a wave generator including a bearing having an outer ring in contact with the inner circumferential surface, an inner ring, and balls intervening between the outer ring and the inner ring, and moving a mesh position between the internal gear and the external gear about the rotation axis, wherein $0.30 \leq L1/L \leq 0.50$, wherein a face width of the external teeth is L and a distance from an end of the external teeth at an opposite side to the barrel part to a center of the ball is L1 in a plan view from a direction perpendicular to the rotation axis.

BRIEF DESCRIPTION OF THE DRAWINGS

FIG. 2 is a sectional view showing a gearing according to a first embodiment of the present disclosure, cut along a plane containing an axial line a.

FIG. 3 is a front view of the gearing shown in FIG. 2 as seen from a direction of the axial line a.

FIG. 7 is a sectional view showing a gearing according to a second embodiment of the present disclosure, cut along the plane containing the axial line a.

FIG. 8 is a sectional view showing a gearing unit according to a third embodiment of the present disclosure, cut along the plane containing the axial line a.

DESCRIPTION OF EXEMPLARY EMBODIMENTS

As below, a gearing, gearing unit, and robot according to the present disclosure will be explained in detail based on preferred embodiments shown in the accompanying drawings.

1. Robot

Figure 1:
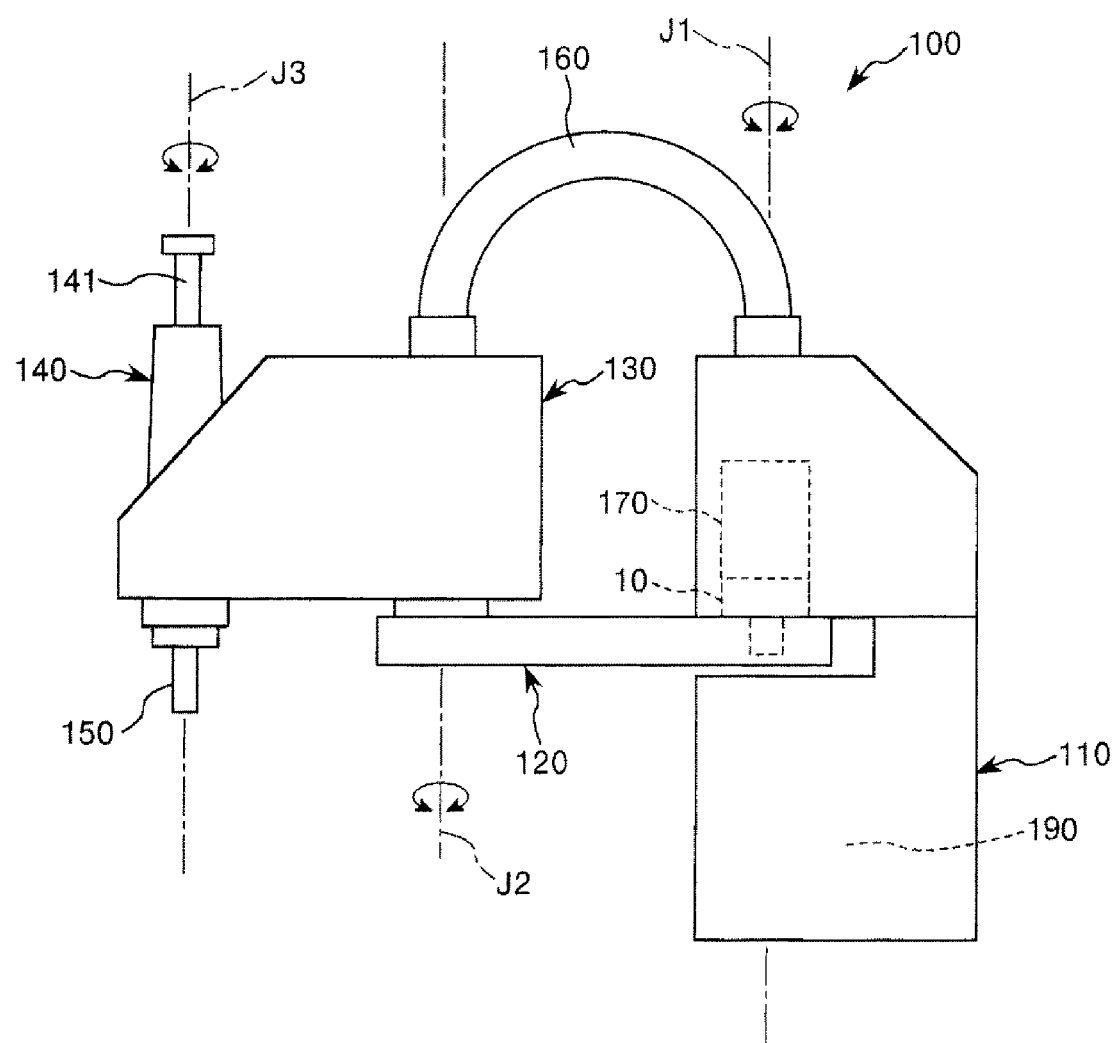
FIG. 1 is a side view showing a schematic configuration of a robot according to an embodiment of the present disclosure.

FIG. 1 is the side view showing the schematic configuration of the robot according to the embodiment of the present disclosure. Note that, hereinafter, for convenience of explanation, the upside in FIG. 1 is referred to as "upper" and the downside is referred to as "lower". Further, a base 110 side in FIG. 1 is referred to as "proximal end side" and an opposite side thereto, i.e., an end effector 150 side is referred to as "distal end side". Furthermore, upward and downward directions in FIG. 1 are referred to as "vertical directions" and leftward and rightward directions are referred to as "horizontal directions".

The robot 100 shown in FIG. 1 is e.g. a robot used for work of feeding, removing, carrying, assembly, etc. of precision apparatuses and components forming the apparatuses, i.e., objects. As shown in FIG. 1, the robot 100 has the base 110, a first arm 120, a second arm 130, a work head 140, the end effector 150, and a wire routing part 160. As below, the respective parts of the robot 100 will be sequentially and briefly explained.

The base 110 is fixed to e.g. a floor surface (not shown) by bolts or the like. Inside of the base 110, a control apparatus 190 that performs integrated control of the robot 100 is provided. Further, the first arm 120 is coupled to the base 110 rotatably about a first axis J1 (rotation axis) along the vertical directions relative to the base 110. That is, the first arm 120 relatively rotates to the base 110.

Here, within the base 110, a motor 170 as a first motor such as a servo motor that generates a drive force for rotating the first arm 120, and a gearing 10 as a first reducer that reduces rotation by the drive force of the motor 170 are provided. The input shaft of the gearing 10 is coupled to the shaft of the motor 170 and the output shaft of the gearing 10 is coupled to the first arm 120. Accordingly, when the motor 170 drives and the drive force thereof is transmitted to the first arm 120 via the gearing 10, the first arm 120 rotates about the first axis J1 within a horizontal plane.

The second arm 130 is coupled to the distal end portion of the first arm 120 rotatably about a second axis J2 (rotation axis) along the vertical directions relative to the first arm 120. Within the second arm 130, a second motor that generates a drive force for rotating the second arm 130 and a second reducer that reduces the rotation by the drive force of the second motor (not shown) are provided. The drive force of the second motor is transmitted to the second arm 130 via the second reducer, and thereby, the second arm 130 rotates about the second axis J2 relative to the first arm 120 within a horizontal plane.

The work head 140 is placed in the distal end portion of the second arm 130. The work head 140 has a spline shaft 141 inserted through a spline nut (not shown) and a ball screw nut (not shown) coaxially placed in the distal end portion of the second arm 130. The spline shaft 141 is rotatable about a third axis J3 thereof and movable in the upward and downward directions relative to the second arm 130.

Within the second arm 130, a rotating motor and an elevating motor are placed (not shown). The drive force of the rotating motor is transmitted to the spline nut by a drive force transmission mechanism (not shown) and, when the spline nut rotates forward and backward, the spline shaft 141 rotates forward and backward about the third axis J3 along the vertical directions.

On the other hand, the drive force of the elevating motor is transmitted to the ball screw nut by a drive force transmission mechanism (not shown) and, when the ball screw nut rotates forward and backward, the spline shaft 141 moves upward and downward according to the rotation directions.

The end effector 150 is coupled to the distal end portion of the spline shaft 141. The end effector 150 is not particularly limited to, but includes e.g. a member that grips an object and a member that processes an object.

A plurality of wires coupled to the respective electronic components placed within the second arm 130 e.g. the second motor, the rotating motor, the elevating motor, etc. are routed into the base 110 through the tubular wire routing part 160 coupling the second arm 130 and the base 110. Further, the plurality of wires are collected within the base 110, and thereby, routed to the control apparatus 190 placed within the base 110 with wires coupled to the motor 170 and an encoder (not shown).

As described above, the robot 100 includes the base 110 as a first member, the first arm 120 as a second member rotatably provided relative to the base 110, and the gearing 10 that transmits the drive force from one to the other of the base 110 and the first arm 120.

Note that the first arm 120 and the second arm 130 may be collectively regarded as "second member". Or, "second member" may further include the work head 140 and the end effector 150 in addition to the first arm 120 and the second arm 130.

The above described first member and second member are not limited to those described above, but, for example, the first arm 120 may be regarded as "first member" and the second arm 130 may be regarded as "second member".

In the embodiment, the motor 170 and the gearing 10 are provided in the base 110, however, the motor 170 and the gearing 10 may be provided in the first arm 120. In this case, the output shaft of the gearing 10 may be coupled to the base 110.

2. Gearing

As below, the gearing 10 provided in the robot 100 will be explained in detail.

First Embodiment

Figure 2:
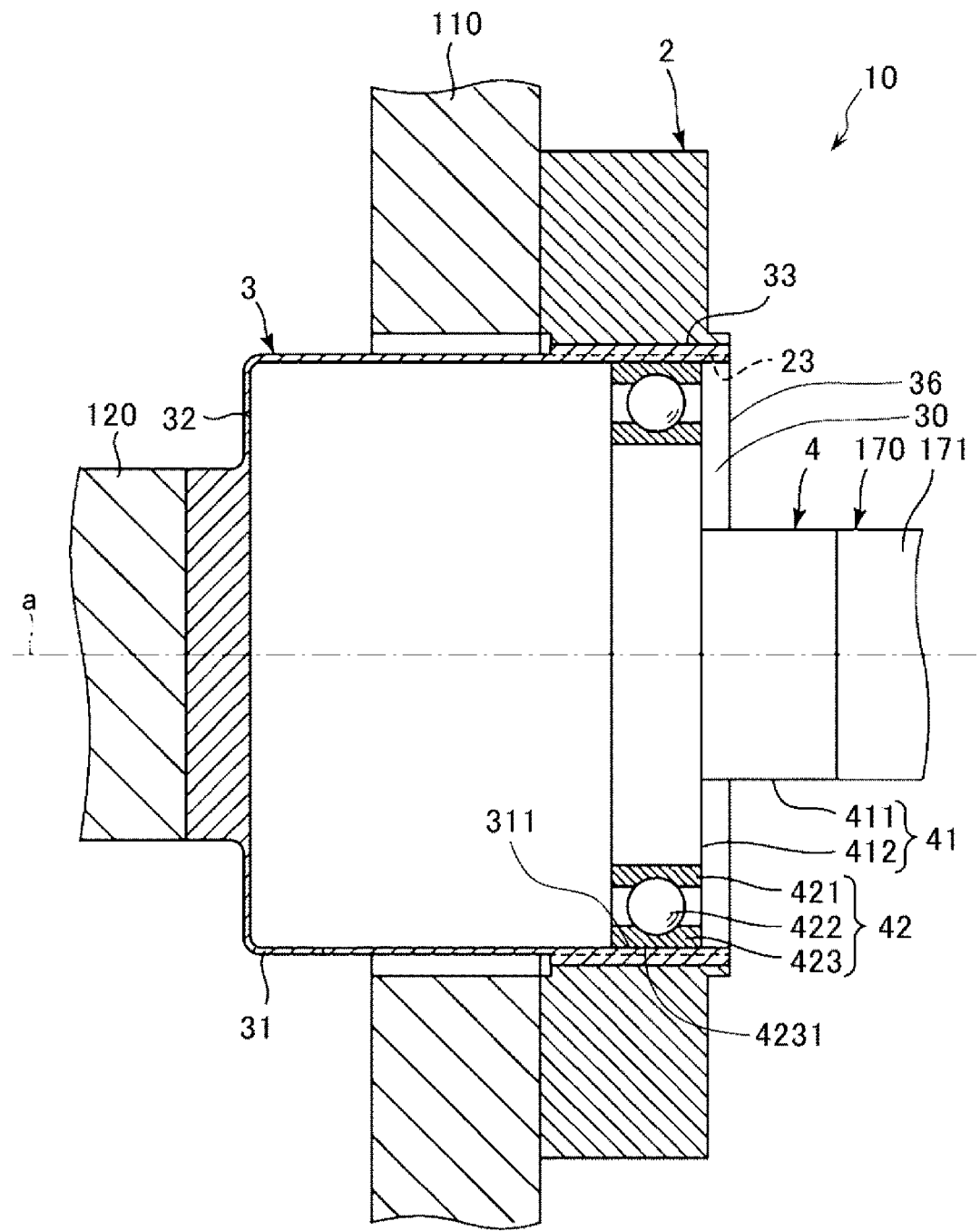
Figure 3:
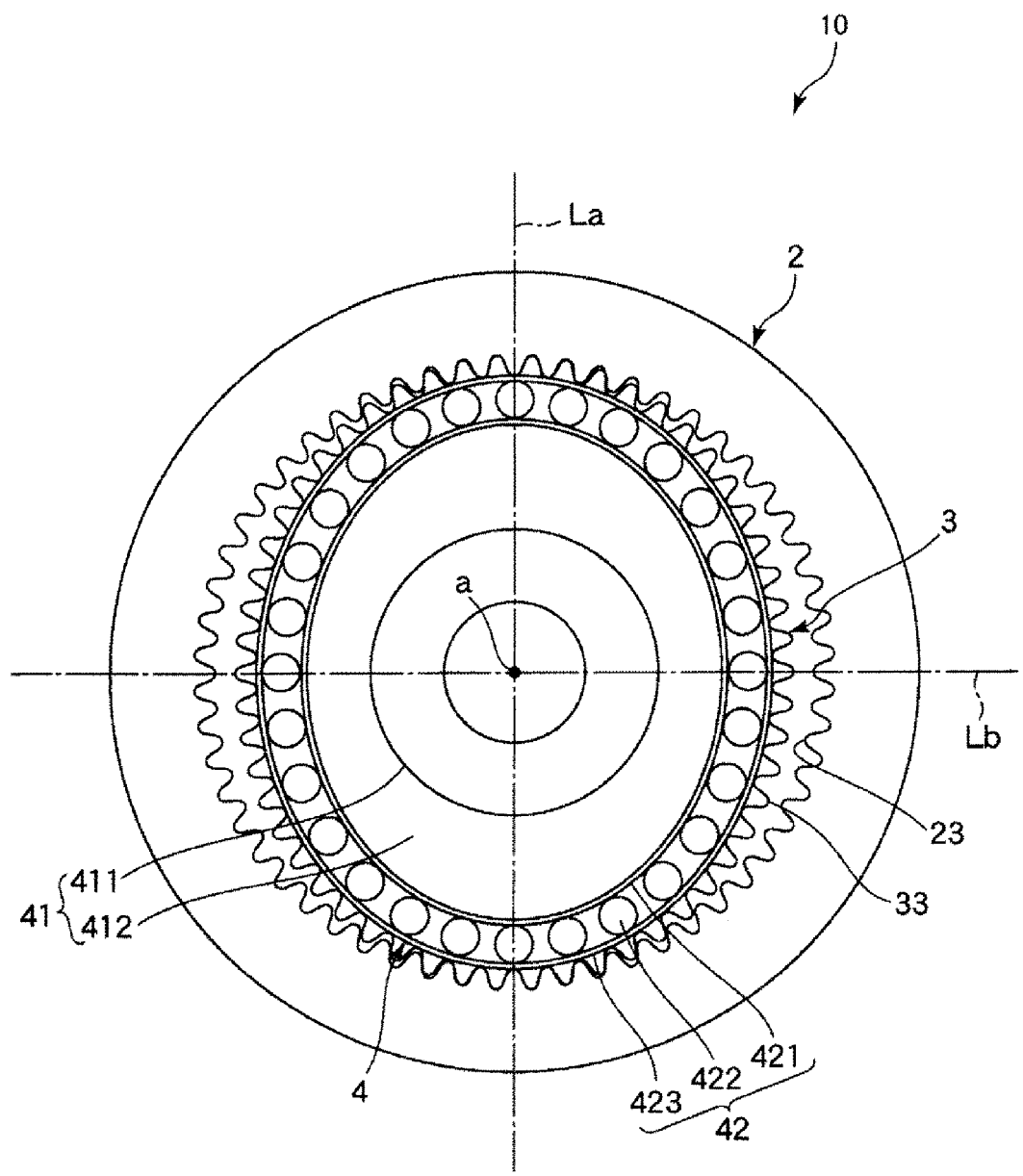
Figure 4:
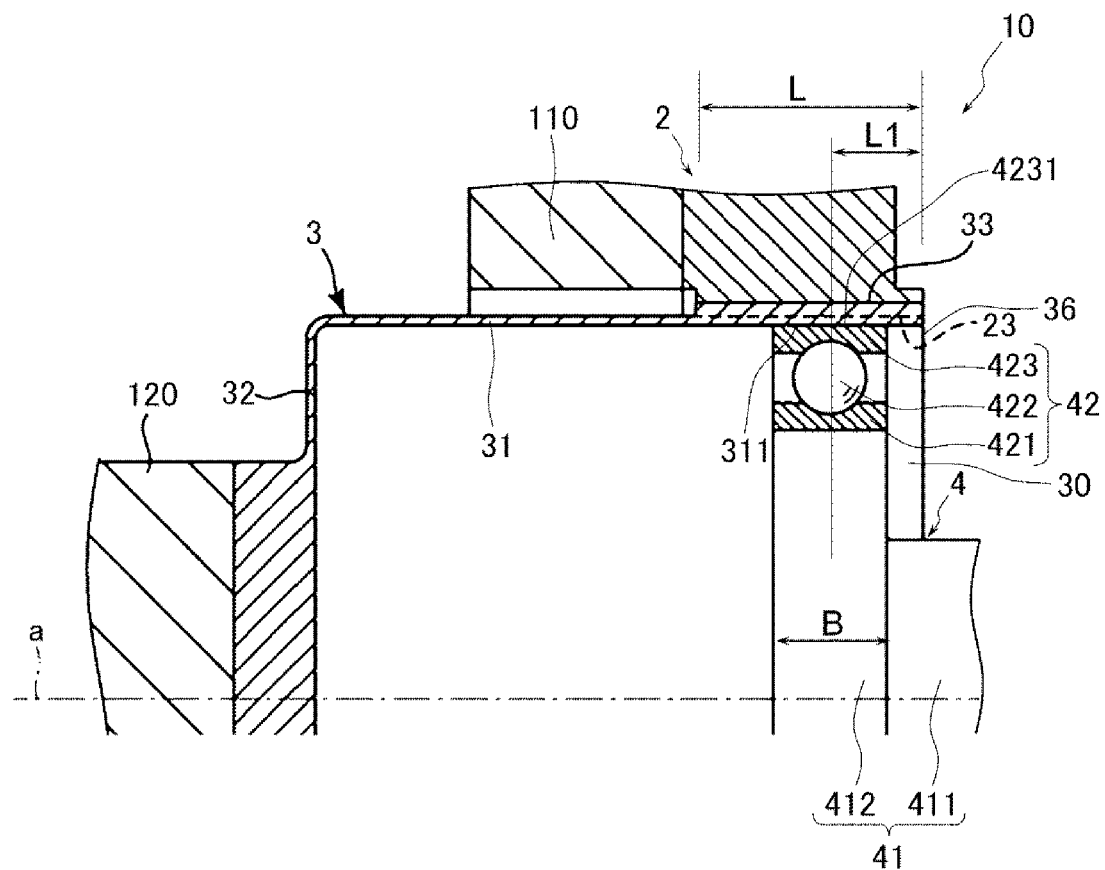
FIG. 4 is a partially enlarged view of FIG. 2.

FIG. 2 is the sectional view showing the gearing according to the first embodiment of the present disclosure, cut along the plane containing the axial line a (rotation axis). FIG. 3 is the front view of the gearing shown in FIG. 2 as seen from the direction of the axial line a. FIG. 4 is the partially enlarged view of FIG. 2. Note that, in the respective drawings, for convenience of explanation, dimensions of the respective parts are shown with exaggeration as appropriate and dimensional rations between the respective parts are not necessarily the same as those of the real dimensional ratios.

The gearing 10 shown in FIG. 2 is a wave gearing and used as e.g. a reducer. The gearing 10 has an internal gear 2, a cup-shaped external gear 3 placed inside of the internal gear 2, and a wave generator 4 placed inside of the external gear 3. Further, a lubricant such as grease may be placed as appropriate in the respective parts of the gearing 10.

Here, one of the internal gear 2, the external gear 3, and the wave generator 4 is coupled to the base 110 (first member) of the above described robot 100, and another one is coupled to the first arm 120 (second member) of the above described robot 100. In the embodiment, the internal gear 2 is coupled to the base 110 (first member) by screws or the like, the external gear 3 is coupled to the first arm 120 (second member) by screws or the like, and the wave generator 4 is coupled to a shaft 171 of the motor 170 of the above described robot 100 by fitting, screws, or the like.

In the gearing 10, when the shaft 171 of the motor 170 rotates, the wave generator 4 rotates at the same rotation speed as that of the shaft 171 of the motor 170. The internal gear 2 and the external gear 3 are different in number of teeth from each other, and thereby, while the mesh position with each other moves in a circumferential direction, the gears relatively rotate about the axial line a (rotation axis) due to the difference in number of teeth between the gears. In the embodiment, the number of teeth of the internal gear 2 is larger than the number of teeth of the external gear 3, and thus, the external gear 3 may be rotated at a lower rotation speed than the rotation speed of the motor 170 relative to the internal gear 2. Thereby, the reducer with the wave generator 4 at the input shaft side and the external gear 3 at the output shaft side may be realized.

Note that the coupling configuration of the internal gear 2, the external gear 3, and the wave generator 4 is not limited to the above described configuration. For example, even when the external gear 3 is fixed to the base 110 and the internal gear 2 is fixed to the first arm 120, the gearing 10 may be used as a reducer. Or, even when the external gear 3 is coupled to the shaft 171 of the motor 170, the gearing 10 may be used as a reducer. In this case, the wave generator 4 may be fixed to the base 110 and the internal gear 2 may be coupled to the first arm 120. Or, when the gearing 10 is used as an increaser, that is, when the external gear 3 is rotated at a higher rotation speed than the rotation speed of the motor 170, the above described relationship between the input side (motor 170 side) and the output side (first arm 120 side) may be inversed.

As shown in FIGS. 2 and 3, the internal gear 2 is a ring-shaped rigid gear having internal teeth 23 and formed by a rigid body that does not substantially bend in the radial direction. In the embodiment, the internal gear 2 is a spur gear. That is, the internal teeth 23 have tooth traces parallel to the axial line a. Note that the tooth trace directions of the internal teeth 23 may be inclined relative to the axial line a. That is, the internal gear 2 may be a helical gear or double-helical gear.

The external gear 3 is inserted into the internal gear 2. The external gear 3 is a flexible gear having external teeth 33 meshing with the internal teeth 23 of the internal gear 2 and being flexurally deformable in the radial direction. The number of teeth of the external gear 3 is smaller than the number of teeth of the internal gear 2. The numbers of teeth of the external gear 3 and the internal gear 2 are different from teach other, and thereby, the reducer may be realized.

In the embodiment, the external gear 3 has the cup shape and the external teeth 33 are formed on the outer circumferential surface thereof. Here, the external gear 3 has a tubular opening part 30 with one end portion in the extension direction of the axial line a, i.e., an end portion on the right side in FIG. 2 as an opening 36, a barrel part 31 located at the other end portion side in the extension direction of the axial line a, i.e., on the left side of the opening part 30 in FIG. 2, and a bottom part 32 located on the left side of the barrel part 31 in FIG. 2. The opening part 30 has the external teeth 33 meshing with the internal gear 2 around the axial line a on the outer circumference thereof. Further, the first arm 120 as a shaft body at the output side is attached to the bottom part 32 by screws or the like.

In the external gear 3, the opening part 30 bends in the radial direction more easily than the bottom part 32, and thereby, good flexural mesh of the external gear 3 with the internal gear 2 may be realized. Further, the rigidity of the bottom part 32 to which the first arm 120 is coupled may be made higher. Therefore, the gearing 10 causes only very small backlash and is suitable for application of repeated reversal. The ratio of the number of teeth meshing at the same time is larger, and thus, a force applied to the single tooth is smaller and higher toque capacity may be obtained.

As shown in FIG. 3, the wave generator 4 is placed inside of the external gear 3 and rotatable about the axial line a. Further, the wave generator 4 deforms the lateral section of the opening part 30 of the external gear 3 into an elliptical shape or elongated circular shape with a long axis La and a short axis Lb and meshes the external teeth 33 with the internal teeth 23 of the internal gear 2. Here, the external gear 3 and the internal gear 2 are meshed with each other inside and outside rotatably about the same axis line a.

In the embodiment, the wave generator 4 has a cam 41 and a bearing 42 attached to the outer circumference of the cam 41. The cam 41 has a shaft portion 411 rotating about the axial line a and a cam portion 412 projecting from one end part of the shaft portion 411 in a direction away from the axial line a and inserted into the opening part 30. Here, the outer circumferential surface of the cam portion 412 forms an elliptical shape or elongated circular shape with the long axis La along the upward and downward directions in FIG. 3 as seen from a direction along the axial line a. The bearing 42 is inserted into the opening part 30 and has flexible inner ring 421 and outer ring 423 and a plurality of balls 422 placed between the rings.

The inner ring 421 is fitted to the outer circumferential surface of the cam portion 412 of the cam 41 and elastically deforms in an elliptical shape or elongated circular shape along the outer circumferential surface of the cam portion 412. With the deformation, the outer ring 423 also elastically deforms in an elliptical shape or elongated circular shape. An outer circumferential surface 4231 of the outer ring 423 is in contact with the inner circumferential surface of the opening part 30. Further, the outer circumferential surface of the inner ring 421 and the inner circumferential surface of the outer ring 423 respectively serve as track surfaces that guide and roll the plurality of balls 422 along the circumferential direction. Furthermore, the plurality of balls 422 are held by a holder (not shown) to keep fixed intervals between each other in the circumferential direction.

In the above described wave generator 4, the orientation of the long axis La of the cam portion 412 changes with the rotation of the cam 41 about the axial line a, and the outer ring 423 also deforms with the change and the mesh position of the internal gear 2 and the external gear 3 with each other is moved in the circumferential direction.

The internal gear 2, the external gear 3, and the wave generator 4 are respectively preferably formed using metal materials, and particularly preferably formed using ferrous metal materials because of better mechanical characteristics and workability and lower cost. The ferrous metal material is not particularly limited, but preferably one of e.g. cast iron, nickel-chromium-molybdenum steel, chromium-molybdenum steel (SCM), maraging steel and precipitation-hardened stainless steel, nodular graphite cast iron (ductile cast iron). Among the materials, when the nodular graphite cast iron is used, quenching and tempering treatment or austempering treatment is performed, and thereby, a good mechanical strength is provided and the life of the gearing 10 may be extended. Further, for the external gear 3, e.g. nickel-chromium-molybdenum steel such as SNCM439 is used, and thereby, hardness thereof may be made higher than that of the internal gear 2 using chromium-molybdenum steel, wearing of the teeth of the external gear 3 may be reduced, and the life of the gearing 10 may be further extended. Note that the internal gear 2 and the wave generator 4 are respectively substantially rigid bodies and can be formed using ceramics materials or the like, however, the metal materials are preferably used for achieving a balance in strength with the external gear 3. When the differences in strength among the members are too large, the member having a weaker strength is extremely easily worn and, as a result, the life of the gearing 10 may be shorter.

Here, as described above, the wave generator 4 is placed inside of the external gear 3. Specifically, as shown in FIG. 2, the opening part 30 has the tubular shape with the right end thereof forming the opening 36. The wave generator 4 is inserted into the opening part 30 from the opening 36. As described above, the outer circumferential surface 4231 of the outer ring 423 of the bearing 42 is in contact with an inner circumferential surface 311 of the opening part 30, and thereby, the external gear 3 is subjected to a force to be pressingly expanded in a direction away from the axial line a by the bearing 42. By the force, the external gear 3 deforms, and the external teeth 33 may be meshed with the internal teeth 23.

On the other hand, the bottom part 32 connects to the left side of the barrel part 31 shown in FIG. 2, and the left end of the barrel part 31 is harder to deform even when subjected to a force to pressingly expand. Accordingly, after the wave generator 4 is inserted into the external gear 3, as the generator is moved toward the left side, the opening 36 at the right end of the opening part 30 deforms to gradually increase the diameter thereof. Then, the amount of mesh between the external teeth 33 and the internal teeth 23 increases. Comparatively, as the position of the wave generator 4 is located closer to the right side in FIG. 2, the diameter of the opening 36 of the opening part 30 gradually decreases. Then, the amount of mesh decreases.

In view of the above described configuration, the inventor appropriately considered the position of the wave generator 4 relative to the external gear 3. In a plan view from a direction perpendicular to the axial line a (rotation axis), i.e., as seen in a direction shown in FIGS. 2 and 4, the face width of the external teeth 33 is L and a distance from the end of the external teeth 33 at one end portion (opening 36) side of the external gear 3, i.e., the right end of the external teeth 33 in FIG. 4 to the center of the ball 422 is L1. The inventor found that, when L and L1 satisfy 0.30≤L1/L≤0.50, load stress generated in the external gear 3 is reduced and reached completion of the present disclosure.

When L1/L satisfies the above described range, the amount of mesh between the external teeth 33 and the internal teeth 23 is optimized in the suppressed amount of deformation of the external gear 3, and the load applied to the external teeth 33 may be dispersed. Thereby, the maximum value of the load stress generated in the external gear 3 may be made lower and the life of the gearing 10 may be extended. Particularly, the above described range of L1/L is a range set using the above described material as the constituent material of the external gear 3 in consideration of a fatigue strength of the material. Accordingly, even under an environment in which repeated load is applied to the external gear 3 and fatigue of metals is caused, the gearing 10 in which a fatigue failure is harder to occur in the external gear 3 may be realized.

Note that, when L1/L is below the above described lower limit value, the force pressingly expanding the external gear 3 decreases and the amount of mesh between the external teeth 33 and the internal teeth 23 also decreases. Then, the tooth contact is concentrated on the tooth tips of the external teeth 33, and load stress on the tooth tips increases. As a result, when the load stress exceeds the mechanical strength, defects of cracking, chipping, etc. may be caused in the external gear 3. On the other hand, when L1/L is above the above described upper limit value, the amount of deformation of the external gear 3 increases and the load stress generated in the external gear 3 increases. Also, in this case, when the load stress exceeds the mechanical strength, defects may be caused in the external gear 3.

The face width L of the external teeth 33 refers to a width of the external teeth 33 in the extension direction of the axial line a. Further, the distance L1 refers to a length in the extension direction of the axial line a from the end at one end portion side of the external teeth 33 in the face width direction, i.e., the right end of the external teeth 33 in FIG. 4 to the center of the ball 422.

As described above, the gearing 10 has the internal gear 2, the external gear 3, and the wave generator 4. The external gear 3 has the external teeth 33 placed around the axial line a and meshing with the internal gear 2, includes the tubular opening part 30 with one end portion (at the right side in FIG. 2) open and the tubular barrel part 31 located at the other side (at the left side in FIG. 2) of the opening part 30, i.e., the opposite side to the above described one end portion, and has flexibility for relatively rotating about the axial line a (rotation axis) to the internal gear 2. That is, the barrel part 31 is adjacent to the external teeth in the axial line a direction. The wave generator 4 includes the bearing 42 having the outer ring 423 in contact with the inner circumferential surface 311 on the inner surface of the external teeth 33, the inner ring 421, and the balls 422 intervening between the outer ring 423 and the inner ring 421, and moves the mesh position between the internal gear 2 and the external gear 3 in the circumferential direction about the axial line a.

In the plan view from the direction perpendicular to the axial line a, letting the face width of the external teeth 33 be L and the distance from the end of the external teeth 33 at one end portion (opening 36) side to the center of the ball 422 be L1, the gearing 10 satisfies 0.30≤L1/L≤0.50. Here, L1 is also expressed as a distance from the end at the opposite side to the side of the barrel part 31 of the ends of the face width of the external teeth 33 to the center of the ball 422.

According to the gearing 10, the amount of mesh between the external teeth 33 and the internal teeth 23 is optimized in the suppressed amount of deformation of the external gear 3. As a result, the load stress generated in the external gear 3 may be reduced, the life of the gearing 10 may be extended, and reliability may be made improved.

The above described robot 100 includes the gearing 10. That is, the robot 100 has the base 110 (first member), the first arm 120 (second member), the gearing 10 that transmits the drive force for relatively rotating the first arm 120 to the base 110 from one to the other of the base 110 and the first arm 120, and the motor 170 (drive source) that generates the drive force. Further, the gearing 10 includes the internal gear 2, the external gear 3 having the external teeth 33 partially meshing with the internal gear 2, including the tubular opening part 30 with one end portion (at the right side in FIG. 2) open and the tubular barrel part 31 located at the other side (at the left side in FIG. 2) of the opening part 30, i.e., the opposite side to the above described one end portion, and having flexibility for relatively rotating about the axial line a (rotation axis) to the internal gear 2, and the wave generator 4 including the bearing 42 having the outer ring 423 in contact with the inner circumferential surface 311 of the external teeth 33, the inner ring 421, and the balls 422 intervening between the outer ring 423 and the inner ring 421, and moving the mesh position between the internal gear 2 and the external gear 3 in the circumferential direction about the axial line a. In the plan view from the direction perpendicular to the axial line a, letting the face width of the external teeth 33 be L and the distance from the end of the external teeth 33 at one end portion (opening 36) side to the center of the ball 422 be L1, the gearing 10 satisfies 0.30≤L1/L≤0.50.

According to the robot 100, as is the above described case, the life of the gearing 10 is extended, and the reliability may be improved.

Figure 5:
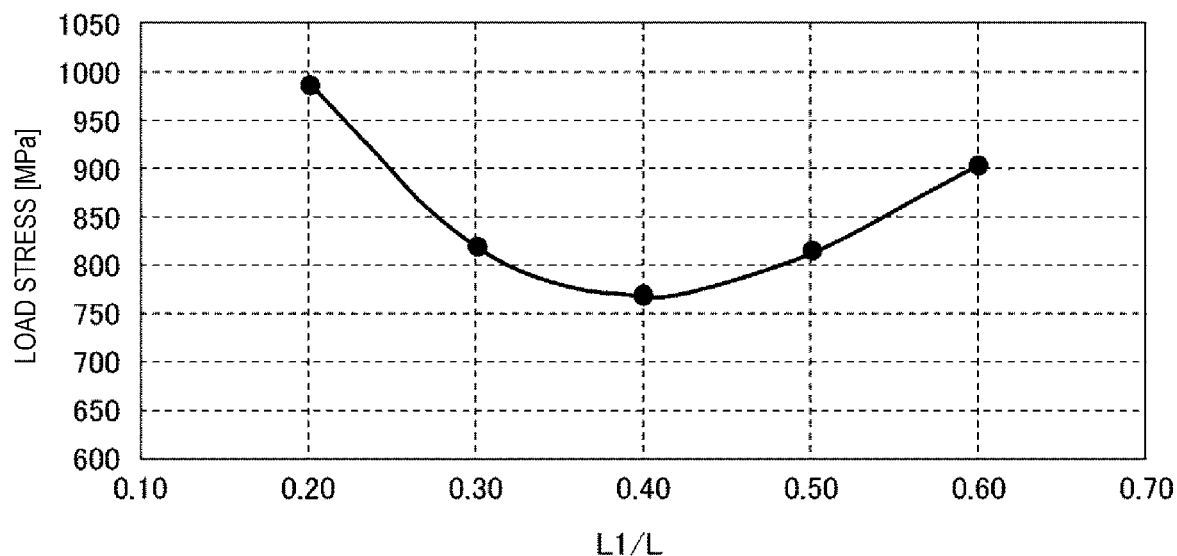
FIG. 5 is a graph showing a relationship between L1/L and load stress with a horizontal axis indicating L1/L and a vertical axis indicating load stress generated in an external gear.

FIG. 5 is the graph showing the relationship between L1/L and load stress with the horizontal axis indicating L1/L and the vertical axis indicating load stress generated in the external gear 3.

As shown in FIG. 5, when L1/L is within the above described range, the load stress generated in the external gear 3 is suppressed to the degree sufficiently lower than the mechanical strength of the external gear 3. Accordingly, within the range, the probability of defects in the external gear 3 may be made sufficiently lower.

Figure 6:
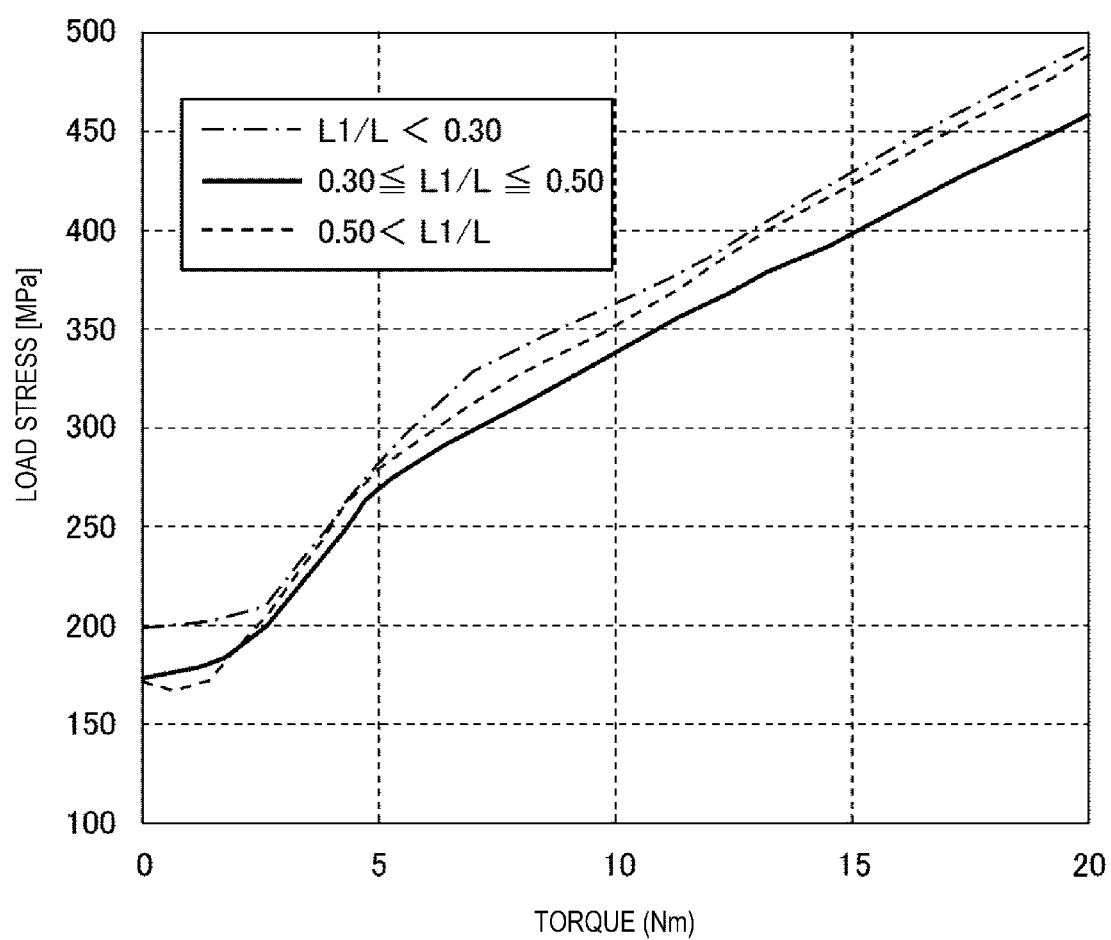
FIG. 6 is a graph showing a relationship between torque and load stress when L1/L is changed at three stages with a horizontal axis indicating torque input to a wave generator and a vertical axis indicating load stress generated in the external gear.

FIG. 6 is the graph showing the relationship between torque and load stress when L1/L is changed at three stages with the horizontal axis indicating torque input to the wave generator 4 and the vertical axis indicating load stress generated in the external gear 3. Note that the three stages include a stage at which L1/L is below the above described lower limit value, a stage at which L1/L is within the above described range, and a stage at which L1/L is above the above described upper limit value.

As shown in FIG. 6, when L1/L is below the above described lower limit value and when L1/L is above the above described upper limit value, the load stress generated in the external gear 3 is relatively high substantially in the entire range in the region in which torque exceeds 5 Nm. On the other hand, when L1/L is within the above described range, the load stress generated in the external gear 3 is relatively low. Accordingly, the above described range of L1/L provides an effect of reducing the load stress generated in the external gear 3 regardless of torque. That is, the load stress generated in the external gear 3 is lower, and thus, the life of the external gear 3 can be extended.

Further, L1/L preferably satisfies $0.45 \leq L1/L \leq 0.50$ and more preferably satisfies $0.45 \leq L1/L \leq 0.49$. Within the ranges, the amount of mesh may be made relatively large with the minimized increase of the load stress generated in the external gear 3. Accordingly, transmission efficiency of power between the external teeth 33 and the internal teeth 23 may be improved. As a result, the gearing 10 with the longer life and the higher transmission efficiency of power is obtained.

The bearing 42 is in contact with the inner circumferential surface 311 of the external gear 3 and has an influence on the amount of mesh between the external teeth 33 and the internal teeth 23. In this regard, the contact area between the outer circumferential surface 4231 of the outer ring 423 and the inner circumferential surface 311 of the external gear 3 has an influence on the load stress generated in the external gear 3.

Specifically, as shown in FIG. 4, letting the width of the outer ring 423 along the face width direction of the external teeth 33 be B, $0.40 \leq B/L \leq 0.95$ is preferably satisfied and $0.60 \leq B/L \leq 0.90$ is more preferably satisfied. B/L satisfies the above described ranges, and thereby, reduction of the ease of deformation when the width B of the outer ring 423 is too large may be suppressed and the ease of local concentration of load stress on the external gear 3 when the width B of the outer ring 423 is too small may be suppressed. As a result, the life of the gearing 10 may be extended with the improved transmission efficiency of power between the external teeth 33 and the internal teeth 23.

Note that, when B/L is below the above described lower limit value, the area of the outer circumferential surface 4231 of the outer ring 423 is smaller and load stress is easily locally concentrated on the external gear 3. Accordingly, defects of cracking etc. may be caused depending on the constituent material of the external gear 3 or the like. On the other hand, when B/L is above the above described upper limit value, the area of the outer circumferential surface 4231 of the outer ring 423 is larger, and a large reaction force may be applied from the external gear 3, the outer ring 423 may be hard to deform when the cam 41 rotates, the close contact between the outer ring 423 and the external gear 3 may be lower depending on the constituent material of the external gear 3 or the like. Accordingly, rotation resistance of the wave generator 4 may be larger and the transmission efficiency of power between the wave generator 4 and the external gear 3 may be lower.

The dimensions of the respective parts of the external gear 3 are not particularly limited, but preferably fall within appropriate ranges depending on the magnitude of torque input to the gearing 10, the constituent material of the external gear 3, etc.

Specifically, a pitch circle diameter of the external gear 3 is preferably within a range from 20 mm to 300 mm and more preferably within a range from 35 mm to 80 mm. The pitch circle diameter of the external gear 3 is set within the ranges, and thereby, when the above described materials are used as the constituent materials of the internal gear 2, the external gear 3, and the wave generator 4, the necessary and sufficient amount of mesh may be secured with sufficient margins kept for the mechanical strengths of those materials and a balance between the transmission efficiency and the life extension may be achieved.

Note that, when the pitch circle diameter of the external gear 3 is below the above described lower limit value or above the upper limit value, the above described effect may be reduced. Accordingly, the pitch circle diameter of the external gear 3 within the above described ranges may be particularly effective in view of the balance between the transmission efficiency and the life extension of the gearing 10.

The pitch circle diameter of the external gear 3 refers to, when the external gear 3 is approximated by a circular cylinder providing a rolling friction, an outer diameter of the circular cylinder. In other words, the contact points of the external teeth 33 in contact with the internal teeth 23 are displaced during rotation and, when the representative positions are approximated by an approximation model, the outer diameter of the circular cylinder as the approximation model is the pitch circle diameter.

In the case of the embodiment, the relative position of the wave generator 4 to the above described external gear 3 is positioned by fixing the external gear 3 to the first arm 120 and coupling the wave generator 4 to the shaft 171 of the motor 170. Note that the positioning means is not limited to the above described means. For example, positioning between the wave generator 4 and the shaft 171 of the motor 170 is made in the rotation direction thereof, however, positioning may be not made in the extension direction of the axial line a. In this case, the wave generator 4 may be positioned by arbitrary positioning means separately provided.

Second Embodiment

Figure 7:
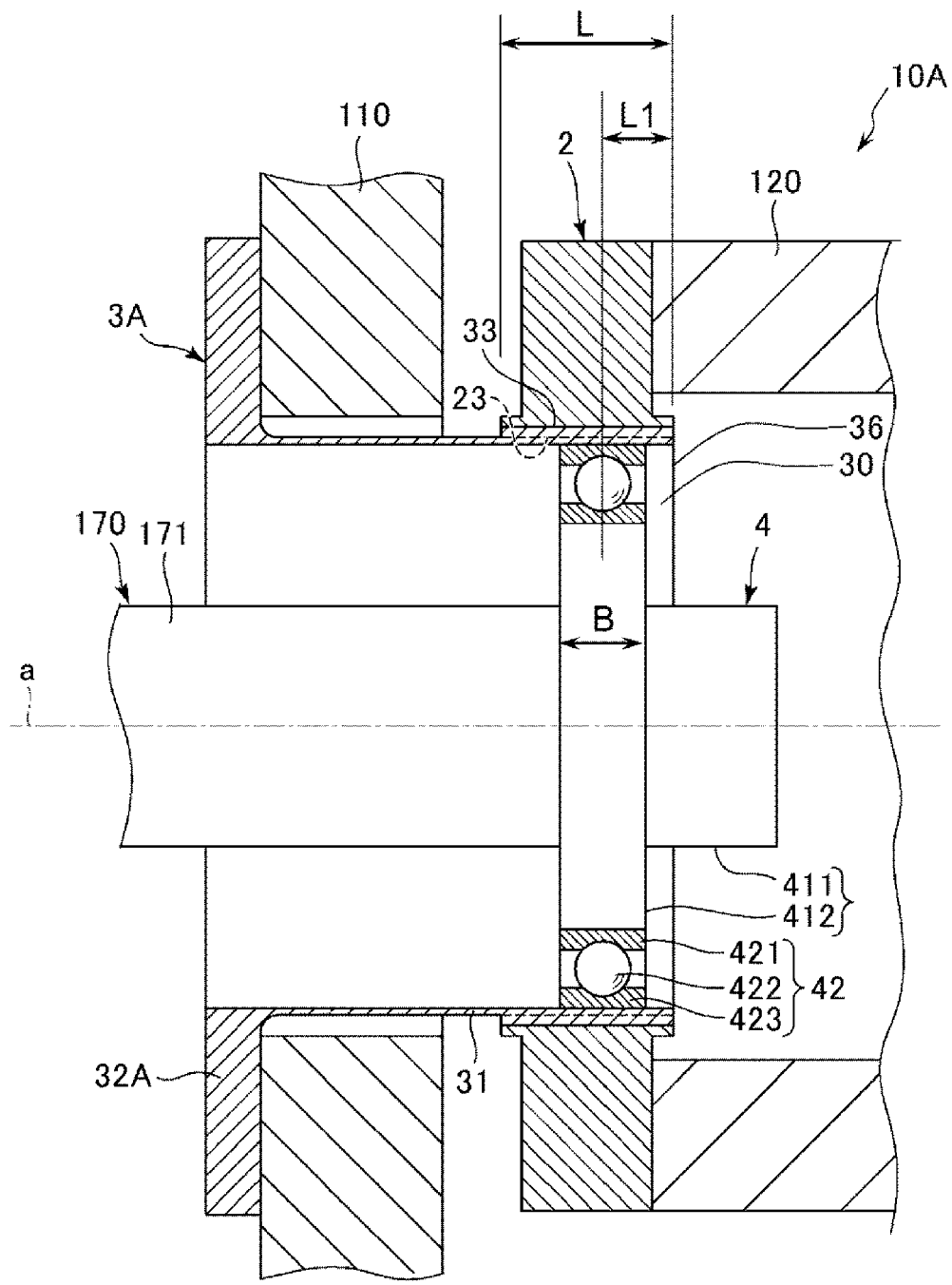

FIG. 7 is the sectional view showing the gearing according to the second embodiment of the present disclosure, cut along the plane containing the axial line a.

The embodiment is the same as the above described first embodiment except that the configuration of the external gear and the attachment configuration of the gearing are different. Note that, in the following description, the embodiment will be explained with a focus on the differences from the above described embodiment, and the explanation of the same items will be omitted. In FIG. 7, the same configurations as those of the above described embodiment have the same signs.

The gearing 10A shown in FIG. 7 has an external gear 3A in place of the external gear 3 of the above described first embodiment. The external gear 3A of the embodiment has a hat shape, and external teeth 33 are formed on the outer circumferential surface thereof. Here, the external gear 3A has a tubular barrel part 31 with the other end portion in the extension direction of the axial line a, i.e., an end portion on the right side in FIG. 7 as an opening 36, and a flange part 32A located on the left side of the barrel part 31 in FIG. 7. The flange part 32A is an attachment part extending outward in the radial direction from the end portion at the left side of the barrel part 31.

One of the internal gear 2, the external gear 3A, and the wave generator 4 of the gearing 10A is coupled to the base 110 (first member) of the above described robot 100 and another one is coupled to the first arm 120 (second member) of the above described robot 100. In the embodiment, the external gear 3A is coupled to the base 110 (first member), the internal gear 2 is coupled to the first arm 120 (second member), and the wave generator 4 is coupled to the shaft 171 of the motor 170 of the above described robot 100.

Further, L1/L, B/L, etc. in the gearing 10A are the same as L1/L, B/L, etc. in the above described gearing 10.

In the above described second embodiment, the same effects as those of the above described first embodiment may be exerted.

Third Embodiment

Figure 8:
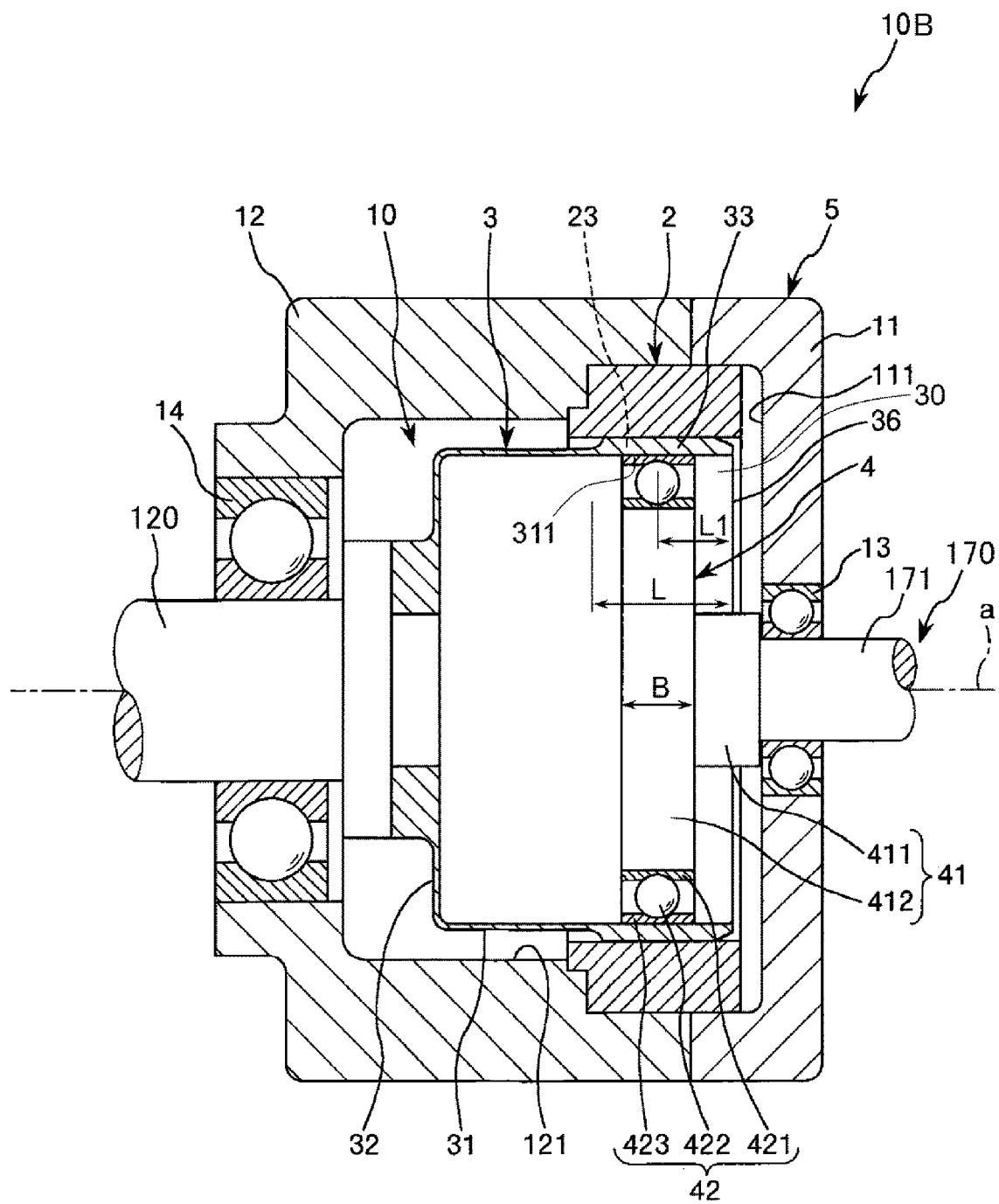

FIG. 8 is the sectional view showing the gearing unit according to the third embodiment of the present disclosure, cut along the plane containing the axial line a.

The embodiment is a gearing unit having the gearing according to the above described first embodiment and a case housing the gearing. Note that, in the following description, the embodiment will be explained with a focus on the differences from the above described embodiments, and the explanation of the same items will be omitted. In FIG. 8, the same configurations as those of the above described embodiment have the same signs.

The gearing unit 10B shown in FIG. 8 has the gearing 10 and the case 5 housing the gearing 10. The internal gear 2 is fixed to the base 110 of the robot 100 via the case 5. These are the main differences and the rest of the gearing unit 10B is the same as that of the gearing 10. That is, L1/L, B/L, etc. in the gearing unit 10B are the same as L1/L, B/L, etc. in the above described gearing 10.

Case

The case 5 shown in FIG. 8 has a lid body 11 substantially in a plate shape supporting e.g. the shaft 171 of the input shaft or the like via a bearing 13, and a cup-shaped main body 12 supporting e.g. the first arm 120 of the out shaft or the like via a bearing 14. Here, the lid body 11 and the main body 12 are coupled to form a space and the above described gearing 10 is housed in the space. Further, the internal gear 2 of the above described gearing 10 is fixed to one of the lid body 11 and the main body 12 by e.g. screws or the like.

An inner wall surface 111 of the lid body 11 has a shape spreading in a direction perpendicular to the axial line a to cover the opening part 30 of the external gear 3. Further, an inner wall surface 121 of the main body 12 has a shape along the outer circumferential surface and the bottom surface of the external gear 3. The case 5 is fixed to the base 110 of the above described robot 100. Here, the lid body 11 may be separated from the base 110 and fixed to the base 110 by e.g. screws or may be integrated with the base 110. The constituent material of the case 5 is not particularly limited to, but includes e.g. a metal material and ceramics material.

Here, in the embodiment, the shaft portion 411 and the bearing 13 are placed in contact. That is, the shaft portion 411 has a larger outer diameter than e.g. the shaft 171 as the input shaft. Accordingly, the left surface of the bearing 13 and the right surface of the shaft portion 411 shown in FIG. 8 are in contact. Thereby, the movement of the shaft portion 411 in a direction away from the external gear 3, i.e., the movement toward the right side in FIG. 8 is restricted. As a result, the wave generator 4 is positioned relative to the external gear 3. That is, the case 5 also functions as positioning means for positioning the wave generator 4 relative to the external gear 3.

Note that, of the case 5, the position in contact with the wave generator 4 is not limited to the above described bearing 13, but may be any position.

As described above, the gearing unit 10B has the internal gear 2, the external gear 3 having the external teeth 33 meshing with the internal gear 2, including the tubular opening part 30 with one end portion (at the right side in FIG. 8) open and the tubular barrel part 31 located at the other side (at the left side in FIG. 8) of the opening part 30, i.e., the opposite side to the above described one end portion, and having flexibility for relatively rotating about the axial line a (rotation axis) to the internal gear 2, the wave generator 4 including the bearing 42 having the outer ring 423 in contact with the inner circumferential surface 311 of the external gear 3, the inner ring 421, and the balls 422 intervening between the outer ring 423 and the inner ring 421, and moving the mesh position between the internal gear 2 and the external gear 3 in the circumferential direction about the axial line a, and the case 5 housing the internal gear 2, the external gear 3, and the wave generator 4 and positioning the wave generator 4 relative to the external gear 3. In the plan view from the direction perpendicular to the axial line a, letting the face width of the external teeth 33 be L and the distance from the end of the external teeth 33 at one end portion (opening 36) side to the center of the ball 422 be L1, the gearing unit 10B satisfies $0.30 \leq L1/L \leq 0.50$.

According to the gearing unit 10B, the amount of mesh between the external teeth 33 and the internal teeth 23 may be optimized in the suppressed amount of deformation of the external gear 3. As a result, the load stress generated in the external gear 3 may be reduced and the life of the gearing unit 10B may be extended.

In the above described third embodiment, the same effects as those of the above described first embodiment may be exerted.

As above, the gearing, gearing unit, and robot according to the present disclosure are explained based on the illustrated embodiments, however, the present disclosure is not limited to those. The configurations of the respective parts may be replaced by arbitrary configurations having the same functions. Further, another arbitrary configuration may be added to the present disclosure.

In the above described embodiments, the horizontal articulated robot is explained, however, the robot according to the present disclosure is not limited to that. For example, the number of joints of the robot is arbitrary, and the robot can be applied to a vertical articulated robot.

What is claimed is:
1. A robot comprising:
   a base having a motor, the motor generating a drive force;
   a first arm; and
   a joint rotatably connecting between the base and the first arm, the joint having a gearing that transmits the drive force from the motor to the first arm for rotating the first arm,
   wherein the gearing has:
      an internal gear;
      an external gear including external teeth placed around a rotation axis and meshing with the internal gear, a barrel part adjacent to the external teeth along the rotation axis, and an inner circumferential surface on an inner surface of the external teeth, the external gear having flexibility and relatively rotating about the rotation axis to the internal gear, the barrel part having first and second ends along the rotation axis, the first end being located next to the external teeth, the barrel part having a flange part, the flange part outwardly extending along a radial direction from an outer periphery of the barrel part at the second end of the barrel part, the radial direction being perpendicular to the rotation axis, the flange part having a side facing the internal gear along the rotation axis; and
      a wave generator including a bearing having an outer ring in contact with the inner circumferential surface, an inner ring, and balls intervening between the outer ring and the inner ring, the wave generator moving a mesh position between the internal gear and the external gear about the rotation axis, and
0.30≤L1/L≤0.50, wherein a face width of the external teeth is L and a distance from an end of the external teeth at an opposite side to the barrel part to a center of the ball is L1 in a plan view from a direction perpendicular to the rotation axis.

2. The robot according to claim 1, wherein 0.45≤L1/L≤0.50.

3. The robot according to claim 1, wherein 0.40≤B/L≤0.95, wherein a width of the outer ring along a face width direction of the external teeth is B.

4. The robot according to claim 1, wherein a pitch circle diameter of the external gear falls within a range from 20 mm to 300 mm.

5. The robot according to claim 4, wherein the pitch circle diameter of the external gear falls within a range from 35 mm to 80 mm.

* * * * *